(12) United States Patent
Ma et al.

(10) Patent No.: US 9,861,969 B2
(45) Date of Patent: Jan. 9, 2018

(54) BINDERLESS MOLECULAR SIEVE CATALYST AND A PREPARATION METHOD THEREOF

(75) Inventors: Guangwei Ma, Shanghai (CN); Huiming Zhang, Shanghai (CN); Jingxian Xiao, Shanghai (CN); Liang Chen, Shanghai (CN); Xiqiang Chen, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 588 days.

(21) Appl. No.: 13/818,295

(22) PCT Filed: Aug. 23, 2011

(86) PCT No.: PCT/CN2011/001408
§ 371 (c)(1),
(2), (4) Date: Apr. 5, 2013

(87) PCT Pub. No.: WO2012/024896
PCT Pub. Date: Mar. 1, 2012

(65) Prior Publication Data
US 2013/0225397 A1 Aug. 29, 2013

(30) Foreign Application Priority Data

Aug. 23, 2010 (CN) .......................... 2010 1 0261544
Aug. 23, 2010 (CN) .......................... 2010 1 0261861
Aug. 23, 2010 (CN) .......................... 2010 1 0261879
Aug. 23, 2010 (CN) .......................... 2010 1 0261893

(51) Int. Cl.
| | |
|---|---|
| *B01J 29/06* | (2006.01) |
| *B01J 29/80* | (2006.01) |
| *B01J 29/04* | (2006.01) |
| *B01J 35/00* | (2006.01) |
| *B01J 35/10* | (2006.01) |
| *C01B 39/02* | (2006.01) |
| *B01J 29/08* | (2006.01) |
| *B01J 29/18* | (2006.01) |
| *B01J 29/40* | (2006.01) |
| *B01J 29/70* | (2006.01) |
| *B01J 35/02* | (2006.01) |
| *B01J 37/00* | (2006.01) |

(52) U.S. Cl.
CPC ............ *B01J 29/80* (2013.01); *B01J 29/041* (2013.01); *B01J 29/061* (2013.01); *B01J 29/084* (2013.01); *B01J 29/18* (2013.01); *B01J 29/40* (2013.01); *B01J 29/70* (2013.01); *B01J 29/7007* (2013.01); *B01J 29/7038* (2013.01); *B01J 29/7042* (2013.01); *B01J 29/7046* (2013.01); *B01J 35/002* (2013.01); *B01J 35/023* (2013.01); *B01J 35/1038* (2013.01); *B01J 35/1066* (2013.01); *B01J 37/0018* (2013.01); *C01B 39/02* (2013.01); *B01J 2229/38* (2013.01)

(58) Field of Classification Search
USPC ................ 502/60, 64, 67, 68, 71, 77, 78, 79
See application file for complete search history.

(56) References Cited

U.S. PATENT DOCUMENTS

| | | | |
|---|---|---|---|
| 6,153,552 A | 11/2000 | Watcher et al. | |
| 6,509,290 B1 | 1/2003 | Vaughn et al. | |
| 7,071,136 B2 | 7/2006 | Chang et al. | |
| 7,455,718 B2* | 11/2008 | Ackley ................. | B01D 53/62 422/169 |
| 2004/0064008 A1* | 4/2004 | Maurer .................... | B01J 29/40 585/640 |
| 2008/0255390 A1* | 10/2008 | Bosch ...................... | B01J 21/12 564/469 |
| 2009/0101011 A1* | 4/2009 | Ackley .................. | B01D 53/62 95/140 |

FOREIGN PATENT DOCUMENTS

| | | |
|---|---|---|
| CN | 101259424 A | 9/2008 |
| CN | 101348260 A | 1/2009 |

(Continued)

OTHER PUBLICATIONS

Machine translation of CN 101348260 A, Jan. 2009.*
Machine translation of CN 101259424 A, Sep. 2008.*
Machine translation of CN 101992122 A, Mar. 2011.*
Machine translation of CN 101992123 A Mar. 2011.*
Na et al., "Cyclic diquaternary ammoiniums for nanocrystalline BEA, MTW and MFI zeolites with intercrystalline mesoporosity", Journal of Materials Cemistry, 2009.*

*Primary Examiner* — Elizabeth Wood
(74) *Attorney, Agent, or Firm* — Novick, Kim & Lee, PLLC; Allen Xue

(57) ABSTRACT

The present invention relate to a binderless molecular sieve catalyst and a process for preparing the same, which are mainly useful for solving the problems of the current catalysts, such as lower activity, less pore volume and worse diffusivity. The present invention relates to a novel binderless molecular sieve catalyst, comprising, based on the weight of the catalyst, 90-100 wt. % of a molecular sieve, 0-10 wt. % of a binder, and 0-10 wt. % of an anti-wear agent, wherein said catalyst has a pore volume of 0.1-0.5 ml/g, an average pore diameter of 50-100 nm, and a porosity of 20-40%; the anti-wear agent is selected from the rod or needle-like inorganic materials having a length/diameter ratio of 2-20. Said catalyst has the advantages of higher activity, greater pore volume, larger average pore diameter and porosity, and better diffusivity, and well solves said problems and can be used for the industrial preparation of binderless molecular sieve catalysts.

23 Claims, 3 Drawing Sheets

(56) References Cited

FOREIGN PATENT DOCUMENTS

| | | |
|---|---|---|
| CN | 101428233 A | 5/2009 |
| CN | 101992122 A | 3/2011 |
| CN | 101992123 A | 3/2011 |
| JP | H02157119 A | 6/1990 |

* cited by examiner

BINDERLESS MOLECULAR SIEVE CATALYST AND A PREPARATION METHOD THEREOF

TECHNICAL FIELD

The present invention relates to a binderless molecular sieve catalyst and a process for preparing the same.

BACKGROUND ART

Due to the uniform and regular porous structure, greater specific surface area and higher thermal stability, better shape-selective catalytic performance and adsorption performance, zeolite molecular sieves are widely applied in the fields such as petrochemical industry and the like. When molecular sieves are used for industrial catalysis, 100% molecular sieves generally cannot be made into the catalyst for the industrial process. Because of worse binding property and too small particle size, molecular sieves still have a strength of lower than 20 Newtons even if press-molded, so that they cannot be molded to form the catalyst directly applied in the industrial process. In addition, the manufacturing cost of molecular sieves is generally higher. If 100% molecular sieves are used as the industrial catalyst, the operation cost of the industrial process increases. The industrial process generally requests that the catalyst has a certain shape and strength so as to be adapted to the industrial reactor. As for a fixed-bed reactor, the catalyst does not need to be moved after installation, but the catalyst shall have a certain anti-crush strength to avoid breakage due to impact during the loading process and to prevent the catalyst loaded in the lower part from breakage under pressure. The breakage and pulverization of the catalyst may result in an increase of the pressure drop in the device, abnormal reaction behavior, or product composition change, which are disadvantageous to the target reaction process. As for a fixed-bed reactor, because of circular flow and turbulent motion of the catalyst per se in the reactor, friction and collision between the catalyst particles, between the catalyst and the reactor wall, between the catalyst and the regenerator wall, between the catalyst and the heater wall, between the catalyst and the flow pipe wall all will grind and damage the catalyst so as to escape from the reaction system in a fine powder form. Such fine powder will pollute the environment, and increase the use-cost of the catalyst. Thus, no matter whether the molecular sieves are applied in a fixed-bed reactor or a fluidized-bed reactor, a binder is necessary for a catalyst composition formed by molecular sieves and carrier materials. Such molecular sieve composition has the catalytic activity, selectivity, stability, shape and strength, and meets the requirements on the catalyst during the industrial process.

Since a binder shall be added for forming the molecular sieves, and the binder wraps the molecular sieves in the molded catalyst, the effective availability of molecular sieves decreases, so as to result in a lower specific surface area and a lower activity of the catalyst. Random porous structure of the binder causes the difficulty of the dispersion of the reaction materials and product in the catalyst, and carbon deposit easily occurs, so as to have effect on the service life of the catalyst. The conversion of the binder in the catalyst into the effective component molecular sieve can overcome said problems and improve the activity and diffusivity of the catalyst.

The binderless molecular sieve catalyst involves converting the binder added during the molding of the zeolite molecular sieve catalyst into the effective component of the molecular sieve, making the whole catalyst containing no binder component and maintaining a better strength of the catalyst. In the binderless molecular sieve catalyst, the binder is completely converted to the molecular sieve component, which increases the molecular sieve content in a unit volume of the catalyst, so as to improve the activity and handling capacity of the catalyst. Meanwhile, since the catalyst contains no binder, it solves the problems that the effective availability of the molecular sieve is reduced because the binder wraps the molecular sieves, and that the binder blocks up the pore channel of the molecular sieves, so as to greatly increase the effective availability and carbon deposit resistance thereof.

Generally, a binderless molecular sieve catalyst means that the binder content in the catalyst is less than 10%.

US6509290 discloses a process for preparing a molecular sieve catalyst, which contains molecular sieve-containing attrition particles and virgin molecular sieve, the attrition particles having been recycled from a catalyst manufacture process or from a reaction system. Such process comprises mixing together molecular sieves, virgin binder and filler, spray-dried attrition particles or agglomerates, and non-virgin attrition particles from a reaction system, drying the mixture to form an end product catalyst particles. In order to increase the strength of the catalyst particles, the attrition particles substantially contain no coke.

US6153552 studies a process for preparing a molecular sieve catalyst, comprising mixing together molecular sieves and an alumina sol which is prepared in a solution and maintains a pH value of 2-10, spray-drying and calcining such mixture at high temperature, to form a catalyst resistant to attrition.

CN1791463 discloses a process for preparing a molecular sieve catalyst, comprising mixing together molecular sieve, liquid, and an effective hardening amount of a dried molecular sieve catalyst to form a slurry, drying the slurry and then calcining to form a catalyst resistant to attrition.

Although some patents have involved the process for preparing a fluidized-bed catalyst, the abrasion resistance thereof is lower and needs to be further improved.

Generally, molecular sieves are prepared by the hydrothermal synthesis, showing a powder form, having no strength, and being easy to lose. Even if they are molded by compression, the strength thereof is also less than 20 Newton, so that they cannot be applied directly. The molecular sieves shall be extruded or spray-molded by adding a binder during the industrial or laboratory application. During the molding process of the conventional molecular sieve catalyst, the weight of the binder to be added is not less than 40% of the total weight of the catalyst. Although the molded catalyst has a certain strength, it has a reduced effective availability and worse activity and diffusivity.

CONTENTS OF THE INVENTION

The first problem to be solved by the present invention is to provide a novel binderless molecular sieve catalyst, which has the advantages of higher activity, greater pore volume, larger average pore diameter and porosity, and better diffusivity.

The second problem to be solved by the present invention is to provide a novel preparation process for the binderless molecular sieve fixed-bed catalyst as mentioned in the above first technical problem to be solved. Such process has the advantages of simple preparation, lower cost and environmental protection.

The third problem to be solved by the present invention is to provide a novel preparation process for the binderless molecular sieve fluidized-bed catalyst as mentioned in the above first technical problem to be solved. Such process has the advantages of simple preparation, lower cost and environmental protection.

In a first aspect of the present invention, in order to solve the first problem above, the present invention comprises a binderless molecular sieve catalyst, comprising, based on the weight of the catalyst, 90-100 wt. % of a molecular sieve, 0-10 wt. % of a binder, and 0-10 wt. % of an anti-wear agent, wherein said catalyst has a pore volume of 0.10-0.52 ml/g, an average pore diameter of 50-100 nm, and a porosity of 20-40%; the anti-wear agent is selected from the rod or needle-like inorganic materials having a length/diameter ratio of 2-20.

In one preferred embodiment, the content of the binder in the binderless-type catalyst may be less than 5 wt. %, preferably less than 2 wt. %, more preferably less than 1 wt. %, based on the weight of the catalyst.

In one preferred embodiment, the catalyst has a pore volume of 0.15-0.3 ml/g, an average pore diameter of 50-70 nm, a porosity of 20-30%. In another preferred embodiment, the catalyst has a pore volume of 0.31-0.5 ml/g, an average pore diameter of 71-100 nm, a porosity of 31-40%.

In one preferred embodiment, the molecular sieve in the binderless molecular sieve catalyst comprises at least one selected from the group consisting of ZSM-5, ZSM-23, ZSM-11, mordenite, Y zeolite, β zeolite, MCM-22, MCM-49, MCM-56, ZSM-5/mordenite, β zeolite/mordenite, ZSM-5/β zeolite, ZSM-5/Y, MCM-22/mordenite, ZSM-5/Magadiite, ZSM-5/β zeolite/mordenite, ZSM-5/β zeolite/Y zeolite and ZSM-5/Y zeolite/mordenite.

In one preferred embodiment, the anti-wear agent is at least one inorganic material selected from the group consisting of asbestos, ceramic fiber, glass fiber, and wollastonite mineral, wherein the anti-wear agent has a length of 1-100 μm and a length/diameter ratio of 3-10 and is in an amount 2-10 wt. % based on the weight of the calcined end product of the catalyst.

In one preferred embodiment, the binder is at least one selected from the group consisting of silica sol and aluminum sol.

In a second aspect of the present invention, in order to solve the second problem above, the present invention comprises a process for preparing a binderless molecular sieve catalyst, comprising the steps of
a) based on the weight of the molded and calcined catalyst, mixing 10-80 wt. % of a molecular sieve, 0.1-20 wt. % of an induction material, 0-20 wt. % of an aluminum compound and 10-80 wt. % of silica, molding and drying to obtain a molded catalyst precursor mix I, wherein the weight percent of the aluminum compound in the mix I is less than that of silica;
b) crystallizing the mix I at 100-200° C. in water vapor or template vapor for 10-300 h, to obtain a binderless molecular sieve catalyst precursor;
c) drying the catalyst precursor, and calcining at 400-700° C. for 1-10 h to obtain a binderless molecular sieve catalyst;
wherein the induction material is at least one selected from the group consisting of i) oxides or hydroxides of the elements of Group IA or IIA of the Periodic Table of Elements, or salts of weak acids thereof, ii) at least one selected from the group consisting of carbonates, bicarbonates, oxalates, citrates and ammonium salts of the elements of Group IA or IIA of the Periodic Table of Elements; the aluminum compound is at least one selected from the group consisting of aluminum salts, aluminum oxides, hydrous oxides of aluminum and hydroxides of aluminum.

In one preferred embodiment, the molecular sieve is at least one selected from the group consisting of ZSM-5, ZSM-23, ZSM-11, mordenite, Y zeolite, β zeolite, MCM-22, MCM-49, MCM-56, ZSM-5/mordenite, ZSM-5/β zeolite, ZSM-5/Y, MCM-22/mordenite, ZSM-5/Magadiite, ZSM-5/β zeolite/mordenite, ZSM-5/β zeolite/Y zeolite and ZSM-5/Y zeolite/mordenite.

In one preferred embodiment, the template is at least one selected from the group consisting of ammonia, ethylene diamine, triethylamine, n-butylamine, hexanediamine, tetrapropylammonium bromide or tetrapropylammonium hydroxide, tetraethylammonium hydroxide, tetraethylammonium bromide and hexamethyleneimine, and is in an amount of 5-200 wt. % based on the weight of the mix I.

In one preferred embodiment, the element of Group IA is at least one selected from the group consisting of sodium and potassium.

In one preferred embodiment, the element of Group IIA is at least one selected from the group consisting of magnesium and calcium.

In one preferred embodiment, the salt of weak acids is at least one selected from the group consisting of bisulfate, sulfite, hydrosulfite, phosphate and biphosphate.

In one preferred embodiment, the ammonium salt is at least one selected from the group consisting of ammonium carbonate, ammonium bicarbonate, ammonium citrate, ammonium oxalate, ammonium sulphate, ammonium bisulphate, ammonium sulphite, ammonium bisulphite, ammonium phosphate, ammonium hydrogen phosphate and diammonium phosphate.

In one preferred embodiment, the molecular sieve in step a) is in an amount of 20-70 wt. %, based on the weight of the molded and calcined catalyst.

In one preferred embodiment, the induction material in step a) is in an amount of 0.5-10 wt. %, based on the weight of the molded and calcined catalyst.

In one preferred embodiment, the aluminum compound in step a) is in an amount of 1-15 wt. %, based on the weight of the molded and calcined catalyst.

In one preferred embodiment, silica in step a) is in an amount of 30-70 wt. %, based on the weight of the molded and calcined catalyst.

In one preferred embodiment, the crystallization is carried out at 120-200° C. for 20-100 h.

In one preferred embodiment, during the molding process of step a), at least one pore-expanding agent selected from the group consisting of methyl cellulose, polyvinyl alcohol, sesbania powder, dissolvable starch and carbon nano-tube is added in an amount of 0.1-2 wt. %, based on the weight of the molded and calcined catalyst.

In one preferred embodiment, the catalyst prepared according to the aforesaid aspect has a strength of 60-200 newton, preferably 100-180 newton.

The binderless catalyst prepared according to the aforesaid aspect is preferably useful in the reactions of preparing low carbon olefins by catalytic cracking of naphtha and by methanol dehydration.

Upon extrusion, the catalyst precursor mix I is present in a form of a long strip solid having a tangential plane in a cylindrical form and a diameter of 0.5-2 mm, and is dried and crushed into short cylindrical catalyst strips having a length of 5 mm per particle for convenience of crystal conversion treatment and evaluation. The mechanical strength of the catalyst in the present invention is measured and calculated according to such shape. In addition, the catalyst precursor mix I can also be made as required into a cellular form, a clover form, a hollow tubular or a spherical form, and the strength standard is extra.

Among the characterizing means of the binderless catalyst, XRD is used to determine the phase contained therein, and the content of each phase; the scanning electron microscope is used to observe the crystal conversion of the binder and the morphology of the produced molecular sieve. Upon crystal conversion, the binder content is determined by the XRD phase quantification and the binder content in the scanning electron photomicroscope. The Si—Al ratio in the catalyst is determined by the chemical analysis method. The strength of the catalyst is determined by measuring the crushing strength of the calcined catalyst on the compression testing machine. The catalyst to be measured has a particle diameter of 1.5 mm and a length of 5 mm. The catalyst is horizontally disposed on the testing machine to determine the maximum pressure suffered when the catalyst is crushed. The crushing strength of 10 particles of the catalyst is measured to take the average. The pore volume, average pore diameter and porosity of the catalyst are determined by the mercury injection method.

In a third aspect of the present invention, in order to solve the third problem above, the present invention comprises a process for preparing a binderless molecular sieve catalyst, comprising the steps of
  (a) homogeneously mixing a molecular sieve, a binder, a dispersant having the induction action, a liquid medium, an optional pore-expanding agent, an optional substrate material, and an optional anti-wear agent to form a suspension, wherein the dispersant is selected from the group consisting of i) salts of weak acids of the elements of Group IA or IIA of the Periodic Table of Elements, or ii) carbonates, bicarbonate, oxalates and citrates of ammonium;
  (b) high velocity (e.g. 6,000-30,000 rpm) shearing and diffusing to control the particle size of the materials in the suspension within 0.1-5 µm;
  (c) spray-drying said suspension to form a microsphere catalyst precursor I;
  (d) calcining such microsphere catalyst precursor I at 300-700° C. for 1-10 h to obtain a catalyst precursor II;
  (e) crystallizing the catalyst precursor II at 100-300° C. in water vapor or template vapor for 10-240 h, to obtain a catalyst precursor III; and
  (f) calcining such microsphere catalyst precursor III at 400-700° C. for 1-10 h to obtain an end product of the catalyst.

In one preferred embodiment, the molecular sieve is at least one selected from the group consisting of ZSM-5, ZSM-23, ZSM-11, mordenite, Y zeolite, β zeolite, MCM-22, MCM-49, MCM-56, ZSM-5/mordenite, ZSM-5/β zeolite, ZSM-5/β zeolite, ZSM-5/Y, MCM-22/mordenite, ZSM-5/Magadiite, ZSM-5/β zeolite/mordenite, ZSM-5/β zeolite/Y zeolite and ZSM-5/Y zeolite/mordenite, and is in an amount of 20-80 wt. % based on the weight of the calcined end product catalyst.

In one preferred embodiment, the binder is at least one selected from silicasol and aluminum sol, and is in an amount of preferably 2-50 wt. % based on the weight of the calcined end product of the catalyst.

In one preferred embodiment, the substrate material is at least one selected from the group consisting of kaolin, calcined kaolin, diatomite, bentonite, argil and clay, and is in an amount of 0-50 wt. % based on the weight of the calcined end product of the catalyst.

In one preferred embodiment, the pore-expanding agent is at least one selected from the group consisting of methyl cellulose, polyvinyl alcohol, sesbania powder, dissolvable starch and carbon nano-tube, and is in an amount 0.1-5 wt. % based on the weight of the molecular sieve in the calcined end product of the catalyst.

In one preferred embodiment, the salt of weak acids is at least one selected from the group consisting of bisulphate, sulphite, hydrosulfite, phosphate and biphosphate.

In one preferred embodiment, the dispersant is at least one selected from the group consisting of tri-ammonium citrate, ammonium oxalate, ammonium carbonate and ammonium bicarbonate, and is in an amount 0.01-5 wt. % based on the weight of the molecular sieve in the calcined end product of the catalyst.

In one preferred embodiment, the anti-wear agent is at least one inorganic material selected from the group consisting of asbestos, ceramic fiber, glass fiber, and wollastonite mineral, wherein the anti-wear agent has a length of 1-100 µm and a length/diameter ratio of 3-10 and is in an amount 2-10 wt. % based on the weight of the calcined end product of the catalyst.

In one preferred embodiment, the liquid medium is distilled water.

In one preferred embodiment, the solids content of the suspension in step (a) is preferably 10-50%.

In one preferred embodiment, the particle size of the materials is controlled to be 0.1-2 µm by using a high velocity shearing or cyclic emulsification method.

In one preferred embodiment, the spray-drying is conducted under the conditions of an inlet temperature of 180-350° C., an outlet temperature of 100-180° C., a centrifugal rotational speed of 5,000-15,000 rpm, and a cyclone pressure difference of 0.5-1.0 KPa at the outlet.

In one preferred embodiment, after the spray-dried catalyst is calcined at high temperature, the particles of the catalyst precursor II have an average particle size of 50-90 µm, a specific surface area of 100-300 $m^2$/g, an average pore diameter of 1-20 nm, a density of 0.6-1.2 g/ml and an abrasion index of 0.005-1.2 wt. %/h (when an anti-wear agent is added, the abrasion index may reach 0.001 wt. %/h).

In one preferred embodiment, the template is at least one selected from the group consisting of ammonia, ethylene diamine, triethylamine, n-butylamine, hexanediamine, tetrapropylammonium bromide or tetrapropylammonium hydroxide, tetraethylammonium hydroxide, tetraethylammonium bromide and hexamethyleneimine, and is in an amount of 5-200 wt. % based on the weight of the molded and calcined catalyst precursor II.

In one preferred embodiment, the crystallization is carried out at 120-200° C. for 20-200 h.

Among the characterizing means of the binderless catalyst, XRD is used to determine the phase contained therein, and the content of each phase; the scanning electron microscope is used to observe the crystal conversion of the binder and the morphology of the produced molecular sieve. Upon crystal conversion, the binder content is determined by the XRD phase quantification and the binder content in the scanning electron photomicroscope. The Si—Al ratio in the catalyst is determined by the chemical analysis method. The abrasion index of the catalyst is determined by the solid granular catalyst abrasion tester, wherein nitrogen gas is sued as the carrier gas. The pore volume, average pore diameter and porosity of the catalyst are determined by the mercury injection method. The specific surface areas of the catalyst precursor II and end product catalyst are determined by the nitrogen temperature programmed desorption.

In the second aspect of the present invention, the environment and material proportion adapted to the growth of molecular sieves are controlled by using as the crystal seed the molecular sieves added into the molded catalyst, so as to nucleate the binder and to make it grow under the common induction of the crystal seed and induction materials and only in an environment of water vapor. As a result, the binder is converted into the effective component of molecular sieves, so as to obtain a binderless molecular sieve catalyst and to achieve the object of simplicity and environmental protection. In the produced binderless molecular sieve catalyst, the binder may be in an amount of less than 2 wt. %, preferably less than 1 wt. %, or even there is no binder (i.e. the catalyst merely contains molecular sieves and an optional anti-wear agent). Since the molecular sieve content in the catalyst per unit volume is higher, the active site number in the catalyst per unit volume is greater, so that the binderless molecular sieve catalyst has a higher activity. Since the crystal grains of the binderless catalyst molecular sieves obtained by crystal conversion are interlaced with each other, and closely integrated with each other, the catalyst strength may reach 120-200 newton per grain, preferably higher than 180 newton per grain. Since a template can be omitted during the crystal conversion, the technological process of crystal conversion is simple and environmentally friendly. Some salts of weak acids, carbonates, oxalates, citrates or ammonium salts are added during the preparation of the binderless molecular sieve catalyst, so as to have the induction action during the crystal conversion and to produce some macropores due to decomposition of the salts and thus have the function of the pore-expanding agent. Thus the produced catalyst has the advantages of higher pore volume, greater average pore diameter and porosity and better diffusivity. The fixed-bed catalyst produced according to the present invention can be used in the reaction for producing propylene by catalytic cracking of naphtha. The yield of dienes of ethylene and propylene is preferably higher than 53%, more preferably higher than 55%.

In the third aspect of the present invention, at least one selected from the group consisting of, e.g. tri-ammonium citrate, ammonium oxalate, ammonium carbonate and ammonium bicarbonate is added to make the components in the catalyst being homogeneously dispersed and difficult to agglomerate. By high velocity emulsification and shearing, the suspension is not easy to stratify or precipitate, and the prepared catalyst has a smooth surface and a high sphericity. When heated, these salts of weak acids are easy to decompose so as to produce gases, which is advantageous to increasing the porosity, average particle diameter and surface area of molecular sieves. When the dispersant is selected from the salts of weak acids of the elements of Group IA or IIA, such dispersant has a certain low acidity. Even if heated and decomposed, the dispersant may produce certain basic oxides. The presence of these basic oxides is advantageous to convert the binder and substrate components into the molecular sieve components. Without template or molecular sieves, these suitable ingredients may be converted into molecular sieve components in a water vapor environment.

In a preferred embodiment, the catalyst has a better diffusivity and a higher activity due to the addition of at least one pore-expanding agent selected from the group consisting of methyl cellulose, polyvinyl alcohol, sesbania powder, dissolvable starch and carbon nano-tube during the preparation of the catalyst. Since the formulated slurry is homogeneous, and the substances can closely bind to each other, the phases of the prepared catalyst are closely integrated with each other, so that the end product catalyst obtained thereby has a higher abrasion strength. Since the formulated slurry is homogeneous, the components and substances in the catalyst can closely bind to each other by adding slender crystal anti-wear agents having a higher strength in the preferred embodiment, so that the end product catalyst obtained thereby has a higher abrasion strength and an abrasion index as high as 0.001 wt. %/h (e.g. 0.001-0.01 wt %/h), and achieves a better technical effect. The fluidized-bed catalyst produced according to the present invention can be used in the reaction for producing propylene by catalytic cracking of naphtha. The yield of dienes of ethylene and propylene may be higher than 50%.

Unless otherwise noted, the percent in the present invention refers to the weight percent.

EMBODIMENTS

The present invention is further illustrated by the following examples, but is not limited to the examples.

Example 1

Figure 1:
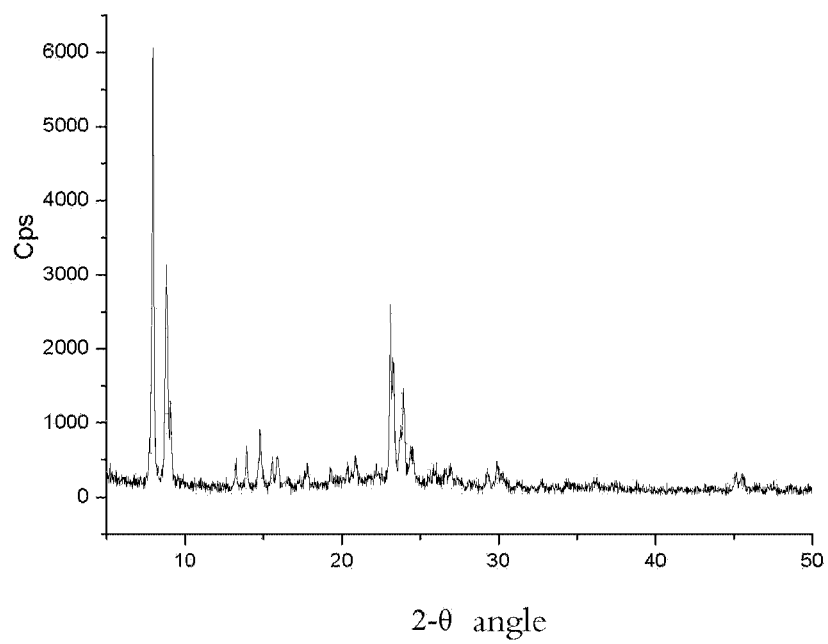
FIG. 1 shows the XRD spectrum of the binderless ZSM-5 catalyst prepared according to Example 1.
Figure 2:
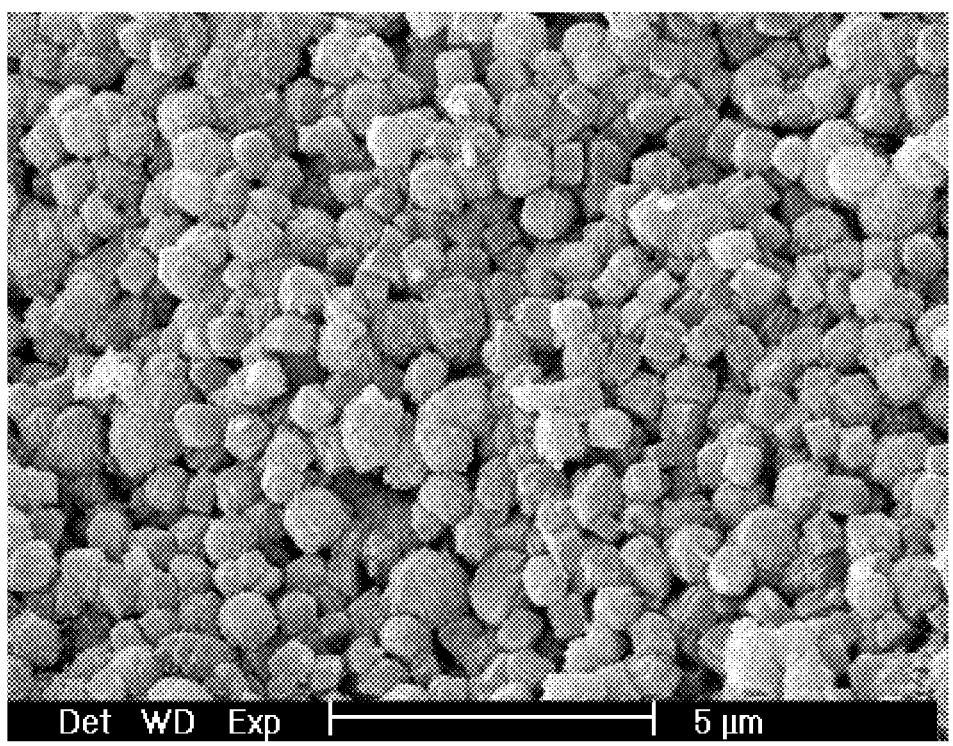
FIG. 2 shows the scanning electron microscope graph of the binderless ZSM-5 catalyst prepared according to Example 1.

60 g of ZSM-5 molecular sieve having a Si—Al ratio (molecular ratio, hereinafter inclusive) of 30 was added to 40 g of 40 wt. % of a silicasol, homogeneously mixed and stirred. 10 ml of 1 mol/l of sodium hydroxide solution was then added, homogeneously mixed and stirred, and extrusion-molded. The molded catalyst was dried at 80° C. for 3 h, fed into an autoclave the inner bottom of which contains water. The catalyst was not brought in contact with liquid water, then sealed in the autoclave and disposed in an oven, crystallized at 170° C. for 60 h, taken out, water-washed twice, oven-dried at 120° C. in an oven for 3 h, calcined in a muffle furnace at 400° C. for 2 h and at 550° C. for 3 h, to obtain a binderless ZSM-5 catalyst. The results of the prepared catalyst are shown in Table 3, wherein the XRD spectrum thereof shown in FIG. 1 which shows a pure ZSM-5 phase. The scanning electron microscope graph of the prepared catalyst is shown in FIG. 2 which shows pure ZSM-5 crystal grains, almost without any amorphous binder. The amount of amorphous binder was determined to be 0.2%, and the crushing-resistant strength of the catalyst sample was determined to be 150 newton per grain.

Example 2

Figure 3:
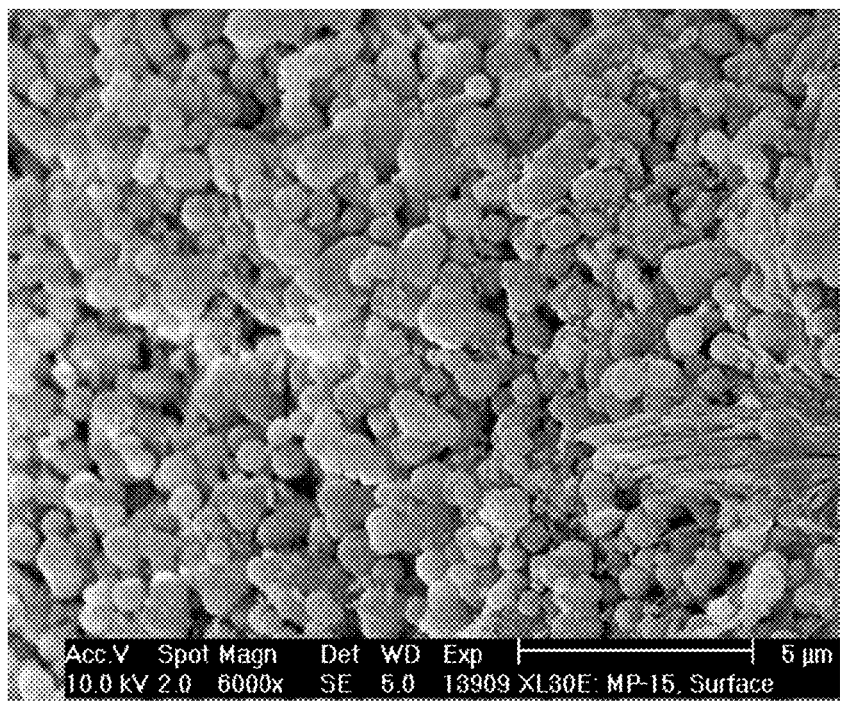
FIG. 3 shows the scanning electron microscope graph of the binderless catalyst prepared according to Example 2.

According to the method in Example 1 of CN101428233A, a mixed crystal molecular sieve of ZSM-5/β zeolite having a Si—Al ratio of 40 was prepared. 60 g of ZSM-5/β zeolite was added to 40 g of 40 wt. % of a silicasol, homogeneously mixed and stirred. Then 2 g of potassium oxide was added, homogeneously mixed and stirred, and extrusion-molded. The molded catalyst was dried at 80° C. for 3 h, fed into an autoclave the inner bottom of which contains water. The catalyst was not brought in contact with liquid water, then sealed in the autoclave and disposed in an oven, crystallized at 165° C. for 80 h, taken out, water-washed twice, oven-dried at 120° C. in an oven for 3 h, calcined in a muffle furnace at 400° C. for 2 h and at 550° C. for 3 h, to obtain a binderless ZSM-5/β zeolite catalyst, wherein the results are shown in Table 3. The XRD spectrum of the prepared catalyst shows a symbiotic phase of ZSM-5 and β zeolite. The scanning electron microscope graph of the prepared catalyst shows a cubical shaped ZSM-5 molecular sieve phase, a spherical β zeolite phase, almost without any amorphous binder, as shown in FIG. 3. The amorphous binder was in an amount of 0.5%, and the crushing-resistant strength of the catalyst sample was determined to be 160 newton per grain.

Examples 3-16

Mordenite having a Si—Al ratio of 20, 60 g of Y zeolite having a Si—Al ratio of 10, MCM-22 having a Si—Al ratio of 40, ZSM-5/mordenite symbiotic molecular sieve having a Si—Al ratio of 20, ZSM-5/β zeolite/Y zeolite symbiotic molecular sieve having a Si—Al ratio of 40, ZSM-5/Y zeolite/mordenite symbiotic molecular sieve having a Si—Al ratio of 20, ZSM-23 having a Si—Al ratio of 20, ZSM-11 having a Si—Al ratio of 30, MCM-49 having a Si—Al ratio of 40, MCM-56 having a Si—Al ratio of 60, ZSM-5/Y zeolite symbiotic molecular sieve having a Si—Al ratio of 20, MCM-22/mordenite having a Si—Al ratio of 40, ZSM-5/Magadiite having a Si—Al ratio of 200 and ZSM-5/β zeolite/mordenite having a Si—Al ratio of 30 were respectively taken (the feedstock proportion is shown in Table 1) to prepare a binderless mordenite catalyst according to the method in Example 1, as shown in Table 3.

Examples 17-22

The molecular sieves used in Examples 3-8 were respectively used. During the molding, the pore-expanding agents selected from the group consisting of sesbania powder, methyl cellulose, dissolvable starch and polyvinyl alcohol were added, wherein the feedstock proportion is shown in Table 2, and other conditions are stated in Example 1, to prepare a binderless zeolite catalyst. The results are shown in Table 3.

Example 23

The binderless catalyst prepared according to Example 1 was exchanged with 5% of an ammonium nitrate solution three times at 90° C. in a solid:liquid (catalyst:ammonium nitrate solution) ratio of 1:10, and then calcined at 550° C. for 3 h, to obtain a hydrogen-type binderless ZSM-5/β zeolite symbiotic molecular sieve catalyst. The activity of the catalyst was evaluated by using the raw material $C_4$-$C_{10}$ light oils produced by Sinopec Shanghai Gaoqiao Company and a fixed-bed reactor having a diameter of 12 mm under the conditions of a reaction temperature of 650° C., a reaction pressure of 0.02 MPa, a weight hourly space velocity of 1 $h^{-1}$, a water/feedstock oil weight ratio of 1:1. The product distribution after half an hour is shown in Table 5; the ethylene weight yield is 28%; the propylene weight yield is 27%; the diene weight total yield is 55% (see Table 6 for results).

Example 24

The binderless catalyst prepared according to Example 8 was exchanged with 5% of an ammonium nitrate solution three times at 90° C. in a solid:liquid (catalyst:ammonium nitrate solution) ratio of 1:10, and then calcined at 550° C. for 3 h, to obtain a hydrogen-type binderless molecular sieve catalyst. The catalyst was evaluated by using methanol as the raw material and a fixed-bed reactor having a diameter of 12 mm under the conditions of 450° C., a weight hourly space velocity of 1 $h^{-1}$, a water/methanol weight ratio of 1:1, a pressure of 0.02 MPa, to obtain the ethylene weight yield of 25%, and the propylene weight yield of 45%.

Comparative Example 1

The catalyst was prepared according to the same method as Example 1, except that sodium hydroxide was not used. The results of the prepared catalyst are shown in Table 3. According to the method of Example 23 above, a hydrogen-type molecular sieve was prepared and evaluated by the same method, and the results are shown in Table 6 below.

TABLE 1

| | Molecular sieves | | Aluminum compounds | | | Induction materials | | Water | Crystallization | |
|---|---|---|---|---|---|---|---|---|---|---|
| Examples | Type | Amount (g) | Type | Amount (g) | Silica (g) | Type | Amount (g) | Amount (g) | temperature (° C.) | Crystallization time (h) |
| Example 3 | Mordenite | 30 | aluminium sulphate | 5 | 20 | sodium hydroxide | 2 | 20 | 170 | 80 |
| Example 4 | Y zeolite | 50 | sodium aluminate | 10 | 10 | potassium hydroxide | 14 | 4 | 180 | 10 |
| Example 5 | MCM-22 | 50 | | | 19 | magnesium hydroxide | 7 | 10 | 150 | 150 |
| Example 6 | ZSM-5/mordenite | 80 | aluminium chloride | 10 | 15 | calcium oxide | 20 | 4 | 160 | 200 |
| Example 7 | ZSM-5/β zeolite/Y zeolite | 80 | pseudo-boehmite | 1 | 80 | potassium oxide | 0.5 | 40 | 165 | 80 |
| Example 8 | ZSM-5/Yzeolite/mordenite | 80 | aluminium nitrate | 5 | 20 | potassium hydroxide | 0.1 | 20 | 180 | 60 |
| Example 9 | ZSM-23 | 10 | aluminium sulphate | 10 | 80 | potassium hydroxide | 20 | 40 | 170 | 240 |

TABLE 1-continued

| Examples | Molecular sieves Type | Amount (g) | Aluminum compounds Type | Amount (g) | Silica (g) | Induction materials Type | Amount (g) | Water Amount (g) | Crystallization temperature (° C.) | Crystallization time (h) |
|---|---|---|---|---|---|---|---|---|---|---|
| Example 10 | ZSM-11 | 70 | sodium aluminate | 10 | 25 | sodium hydroxide | 10 | 20 | 100 | 200 |
| Example 11 | MCM-49 | 10 | sodium aluminate | 10 | 15 | sodium hydroxide | 5 | 4 | 150 | 80 |
| Example 12 | MCM-56 | 70 | sodium aluminate | 5 | 20 | potassium hydroxide | 5 | 20 | 150 | 200 |
| Example 13 | ZSM-5/Y zeolite | 40 | sodium aluminate | 5 | 10 | sodium hydroxide + potassium hydroxide | 5 for each | 20 | 160 | 40 |
| Example 14 | MCM-22/mordenite | 80 | aluminium nitrate | 5 | 20 | potassium hydroxide | 0.1 | 20 | 180 | 60 |
| Example 15 | ZSM-5/Magadiite | 10 | aluminium sulphate | 10 | 80 | potassium hydroxide | 20 | 40 | 170 | 240 |
| Example 16 | ZSM-5/β zeolite/mordenite | 70 | sodium aluminate | 10 | 25 | sodium hydroxide | 10 | 20 | 100 | 200 |

TABLE 2

| Examples | Amount of molecular sieves (g) | Pore-expanding agent Type | Amount (g) | Aluminum compounds Type | Amount (g) | Silica (g) | Induction materials Type | Amount (g) | Crystallization temperature (° C.) | Crystallization time (h) |
|---|---|---|---|---|---|---|---|---|---|---|
| Example 17 | 80 | polyvinyl alcohol | 1 | aluminum hydroxide | 1 | 80 | sodium bisulphate | 0.5 | 170 | 80 |
| Example 18 | 80 | sesbania powder | 0.2 | aluminium nitrate | 5 | 20 | sodium bisulphite | 0.1 | 180 | 60 |
| Example 19 | 10 | dissolvable starch | 0.1 | aluminium sulphate | 10 | 80 | potassium phosphate | 20 | 190 | 240 |
| Example 20 | 70 | methyl cellulose | 2 | sodium aluminate | 10 | 25 | potassium hydrogen phosphate | 10 | 100 | 10 |
| Example 21 | 10 | sesbania powder + dissolvable starch | 1 | sodium aluminate | 10 | 15 | potassium phosphate + sodium bisulphate | 5 for each | 150 | 60 |
| Example 22 | 70 | sesbania powder | 0.6 | sodium aluminate | 5 | 20 | potassium dihydrogen phosphate | 5 | 150 | 300 |

TABLE 3

| Examples | Zeolite content (wt. %) in the resultant binderless catalyst | Binder content (wt. %) in the resultant catalyst | Strength of the resultant catalyst (newton per grain) | Pore volume (ml/g) | Average pore diameter (nm) | Porosity (vol. %) |
|---|---|---|---|---|---|---|
| Example 1 | 99.8 | 0.2 | 150 | 0.34 | 62 | 32 |
| Example 2 | 99.5 | 0.5 | 160 | 0.31 | 51 | 29 |
| Example 3 | 99.4 | 0.6 | 170 | 0.21 | 60 | 25 |
| Example 4 | 98.8 | 1.2 | 150 | 0.28 | 65 | 27 |
| Example 5 | 97.9 | 2.1 | 150 | 0.26 | 64 | 26 |
| Example 6 | 100 | 0 | 190 | 0.3 | 53 | 22 |
| Example 7 | 98.5 | 1.5 | 175 | 0.29 | 58 | 24 |
| Example 8 | 98.6 | 1.4 | 175 | 0.29 | 56 | 24 |
| Example 9 | 95.0 | 5.0 | 80 | 0.31 | 71 | 30 |
| Example 10 | 98.4 | 1.6 | 160 | 0.24 | 54 | 26 |
| Example 11 | 99.9 | 0.1 | 200 | 0.15 | 50 | 20 |

TABLE 3-continued

| Examples | Zeolite content (wt. %) in the resultant binderless catalyst | Binder content (wt. %) in the resultant catalyst | Strength of the resultant catalyst (newton per grain) | Pore volume (ml/g) | Average pore diameter (nm) | Porosity (vol. %) |
|---|---|---|---|---|---|---|
| Example 12 | 95.5 | 4.5 | 110 | 0.26 | 65 | 28 |
| Example 13 | 96.1 | 3.9 | 90 | 0.32 | 69 | 29 |
| Example 14 | 98.5 | 1.5 | 175 | 0.19 | 54 | 27 |
| Example 15 | 98.6 | 1.4 | 175 | 0.17 | 53 | 26 |
| Example 16 | 95.0 | 5.0 | 80 | 0.32 | 70 | 30 |
| Example 17 | 98.4 | 1.6 | 160 | 0.17 | 55 | 28 |
| Example 18 | 99.9 | 0.1 | 200 | 0.10 | 49 | 20 |
| Example 19 | 98.5 | 1.5 | 175 | 0.14 | 52 | 26 |
| Example 20 | 98.6 | 1.4 | 175 | 0.16 | 53 | 27 |
| Example 21 | 95.0 | 5.0 | 80 | 0.27 | 70 | 31 |
| Example 22 | 98.4 | 1.6 | 160 | 0.19 | 56 | 26 |
| Com. Exp. 1 | 62.1 | 37.9 | 70 | 0.08 | 20 | 11 |

TABLE 4

| Items | Data |
|---|---|
| Density (20° C.) kg/m3 | 704.6 |
| Distillation range Initial distillation range (° C.) | 40 |
| Distillation range Final distillation range (° C.) | 160 |
| Saturated vapor pressure (20° C.) kpa | 50.2 |
| Alkane % (wt. %) | 65.2 |
| Cyclane % (wt. %) | 28.4 |
| Alkene % (wt. %) | 0.2 |
| Arene % (wt. %) | 6.2 |

TABLE 5

| Product distribution | Product weight yield (%) |
|---|---|
| Methane | 5.2 |
| Ethane | 6.1 |
| Ethylene | 28.0 |
| Propane | 6.5 |
| Propylene | 27.0 |
| Butane | 8.7 |
| Butene | 7.6 |
| Fractions having more than 5 carbons | 8.8 |
| Others | 2.1 |

TABLE 6

| Examples | Catalyst intensity (Newton/grain) | Ethylene yield (wt. %) | Propylene yield (wt. %) | Diene yield (wt. %) |
|---|---|---|---|---|
| Example 23 | 150 | 28 | 27 | 55 |
| Com. Exp. 1 | 70 | 24 | 23 | 47 |

Example 25

60 g of ZSM-5 molecular sieve having a Si—Al ratio (SiO$_2$/Al$_2$O$_3$ molecular molar ratio, hereinafter inclusive) of 30, and 3.2 g of sesbania powder were homogeneously mixed and stirred. 40 g of 40 wt. % of a silicasol was added, homogeneously mixed and stirred. 10 ml of 1 mol/l of sodium bicarbonate solution was then added, homogeneously mixed and stirred, and extrusion-molded. The molded catalyst was dried at 80° C. for 3 h, fed into an autoclave the inner bottom of which contains water. The catalyst was not brought in contact with liquid water, then sealed in the autoclave and disposed in an oven, crystallized at 180° C. for 60 h, taken out, water-washed twice, oven-dried at 120° C. in an oven for 3 h, calcined in a muffle furnace at 400° C. for 2 h and at 550° C. for 3 h, to obtain a binderless ZSM-5 catalyst. The XRD spectrum of the prepared catalyst shows a pure ZSM-5 phase. The scanning electron microscope graph thereof shows pure ZSM-5 crystal grains, almost without any amorphous binder. The amorphous binder was in an amount of 0.2%, and the crushing-resistant strength of the catalyst sample was determined to be 145 newtons per grain. By the mercury-injection method, the pore volume is determined to be 0.38 ml/g; the average pore diameter thereof is 82 nm; and the porosity thereof is 36%, as shown in Table 9.

Example 26

According to the method in Example 1 of CN101428233A, a mixed crystal molecular sieve of ZSM-5/β zeolite having a SiO$_2$/Al$_2$O$_3$ molecular molar ratio of 40 was prepared. 60 g of ZSM-5/β zeolite was added to 40 g of 40 wt. % of a silicasol, homogeneously mixed and stirred. Then 20 ml of 1 mol/l of ammonium citrate was added, homogeneously mixed and stirred, and extrusion-molded. The molded catalyst was dried at 80° C. for 3 h, fed into an autoclave the inner bottom of which contains water. The catalyst was not brought in contact with liquid water, then sealed in the autoclave and disposed in an oven, crystallized at 165° C. for 80 h, taken out, water-washed twice, oven-dried at 120° C. in an oven for 3 h, calcined in a muffle furnace at 400° C. for 2 h and at 550° C. for 3 h, to obtain a binderless ZSM-5/β zeolite catalyst are shown in Table 9. The crushing-resistant strength of the catalyst sample was determined to be 160 newtons per grain, and the amorphous binder was in an amount of 0.6%. By the mercury-injection method, the pore volume is determined to be 0.37 ml/g; the average pore diameter thereof is 80 nm; and the porosity thereof is 35%.

Examples 27-40

Mordenite having a Si—Al ratio of 20, 60 g of Y zeolite having a Si—Al ratio of 10, MCM-22 having a Si—Al ratio of 40, ZSM-5/mordenite symbiotic molecular sieve having a Si—Al ratio of 20, ZSM-5/β zeolite/Y zeolite symbiotic molecular sieve having a Si—Al ratio of 40, ZSM-5/Y zeolite/mordenite symbiotic molecular sieve having a Si—Al ratio of 20, ZSM-23 having a Si—Al ratio of 20, ZSM-11 having a Si—Al ratio of 30, MCM-49 having a Si—Al ratio of 40, MCM-56 having a Si—Al ratio of 60, ZSM-5/Y zeolite symbiotic molecular sieve having a Si—Al ratio of 20, MCM-22/mordenite having a Si—Al ratio of 40, ZSM-5/Magadiite having a Si—Al ratio of 200 and ZSM-5/β zeolite/mordenite having a Si—Al ratio of 30 were respectively taken (the feedstock proportion is shown in Table 7) to prepare a binderless mordenite catalyst according to the method in Example 25, as shown in Table 9.

Examples 41-46

The molecular sieves used in Examples 27-32 were respectively used. During the molding, the pore-expanding agents selected from the group consisting of sesbania powder, methyl cellulose, dissolvable starch and polyvinyl alcohol were added, wherein the feedstock proportion is shown in Table 8, and other conditions are stated in Example 25, to prepare a binderless zeolite catalyst. The results are shown in Table 9.

Example 47

The binderless catalyst prepared according to Example 25 was exchanged with 5% of an ammonium nitrate solution three times at 90° C. in a solid:liquid (catalyst:ammonium nitrate solution) ratio of 1:10, and then calcined at 550° C. for 3 h, to obtain a hydrogen-type binderless ZSM-5/β zeolite symbiotic molecular sieve catalyst. The activity of the catalyst was evaluated by using the raw material $C_4$-$C_{10}$ light oils produced by Sinopec Shanghai Gaoqiao Company (see Table 4 for the physical property indexes of the raw materials) and a fixed-bed reactor having a diameter of 12 mm under the conditions of a reaction temperature of 650° C., a reaction pressure of 0.02 MPa, a weight hourly space velocity of 1 $h^{-1}$, a water/feedstock oil weight ratio of 1:1. The product distribution after half an hour is shown in Table 10; the ethylene weight yield is 28%; the propylene weight yield is 28%; the diene weight total yield is 56%.

Example 48

The binderless catalyst prepared according to Example 32 was exchanged with 5% of an ammonium nitrate solution three times at 90° C. in a solid:liquid (catalyst:ammonium nitrate solution) ratio of 1:10, and then calcined at 550° C. for 3 h, to obtain a hydrogen-type binderless molecular sieve catalyst. The catalyst was evaluated by using methanol as the raw material and a fixed-bed reactor having a diameter of 12 mm under the conditions of 450° C., a weight hourly space velocity of 1 $h^{-1}$, a water/methanol weight ratio of 1:1, a pressure of 0.02 MPa, to obtain the ethylene weight yield of 24%, and the propylene weight yield of 47%.

Comparative Example 2

The catalyst was prepared according to the same method as Example 25, except for that sodium bicarbonate was not used. The results of the prepared catalyst are shown in Table 9. According to the method of Example 47 of the present invention, a hydrogen-type molecular sieve was prepared and evaluated by the same method, and the results are shown in Table 11 below.

TABLE 7

| Examples | Molecular sieves Type | Amount (g) | Aluminum compounds Type | Amount (g) | Silica (g) | Induction materials Type | Amount (g) | Water Type | Crystallization temperature (° C.) | Crystallization time (h) |
|---|---|---|---|---|---|---|---|---|---|---|
| Example 27 | Mordenite | 30 | aluminium sulphate | 5 | 20 | sodium carbonate | 2 | 20 | 170 | 80 |
| Example 28 | Y zeolite | 50 | sodium aluminate | 10 | 10 | potassium carbonate | 14 | 4 | 180 | 10 |
| Example 29 | MCM-22 | 50 | sodium aluminate | 1 | 19 | magnesium carbonate | 7 | 10 | 150 | 150 |
| Example 30 | ZSM-5/Mordenite | 80 | aluminium chloride | 10 | 15 | calcium citrate | 20 | 4 | 160 | 200 |
| Example 31 | ZSM-5/β zeolite/Y zeolite | 80 | pseudo-boehmite | 1 | 80 | ammonium bicarbonate | 0.5 | 40 | 165 | 80 |
| Example 32 | ZSM-5/Y zeolite/Mordenite | 80 | aluminium nitrate | 5 | 20 | ammonium carbonate | 0.1 | 20 | 180 | 60 |
| Example 33 | ZSM-23 | 10 | aluminium sulphate | 10 | 80 | potassium citrate | 20 | 40 | 170 | 240 |
| Example 34 | ZSM-11 | 70 | sodium aluminate | 10 | 25 | sodium oxalate | 10 | 20 | 100 | 200 |
| Example 35 | MCM-49 | 10 | sodium aluminate | 10 | 15 | ammonium oxalate | 5 | 4 | 150 | 80 |
| Example 36 | MCM-56 | 70 | sodium aluminate | 5 | 20 | potassium bicarbonate | 5 | 20 | 150 | 200 |
| Example 37 | ZSM-5/Y zeolite | 40 | sodium aluminate | 5 | 10 | sodium carbonate + potassium carbonate | 5 for each | 20 | 160 | 40 |
| Example 38 | MCM-22/Mordenite | 80 | aluminium nitrate | 5 | 20 | ammonium bisulfate | 0.1 | 20 | 180 | 60 |
| Example 39 | ZSM-5/Magadiite | 10 | aluminium sulphate | 10 | 80 | ammonium bisulphite | 20 | 40 | 170 | 240 |
| Example 40 | ZSM-5/β zeolite/Mordenite | 70 | sodium aluminate | 10 | 25 | ammonium phosphate | 10 | 20 | 100 | 200 |

TABLE 8

| Examples | Amount of molecular sieves (g) | Pore-expanding agent Type | Amount (g) | Aluminum compounds Type | Amount (g) | Silica (g) | Induction materials Type | Amount (g) | Crystallization temperature (° C.) | Crystallization time (h) |
|---|---|---|---|---|---|---|---|---|---|---|
| Example 41 | 80 | polyvinyl alcohol | 1 | aluminum hydroxide | 1 | 80 | ammonium bicarbonate | 0.5 | 170 | 80 |
| Example 42 | 80 | sesbania powder | 0.2 | aluminium nitrate | 5 | 20 | ammonium bisulphite | 0.1 | 180 | 60 |
| Example 43 | 10 | dissolvable starch | 0.1 | aluminium sulphate | 10 | 80 | ammonium citrate | 20 | 190 | 240 |
| Example 44 | 70 | methyl cellulose | 2 | sodium aluminate | 10 | 25 | ammonium hydrogen phosphate | 10 | 100 | 10 |
| Example 45 | 10 | sesbania powder + dissolvable starch | 1 | sodium aluminate | 10 | 15 | ammonium phosphate + ammonium bisulphite | 5 for each | 150 | 60 |
| Example 46 | 70 | sesbania powder | 0.6 | sodium aluminate | 5 | 20 | ammonium dihydrogen phosphate | 5 | 150 | 300 |

TABLE 9

| Examples | Zeolite content (wt. %) in the resultant binderless catalyst | Binder content (wt. %) in the resultant catalyst | Strength of the resultant catalyst (newton per grain) | Pore volume (ml/g) | Average pore diameter (nm) | Porosity (vol. %) |
|---|---|---|---|---|---|---|
| Example 25 | 99.8 | 0.2 | 145 | 0.38 | 82 | 36 |
| Example 26 | 99.4 | 0.6 | 160 | 0.37 | 80 | 35 |
| Example 27 | 99.2 | 0.8 | 170 | 0.31 | 80 | 35 |
| Example 28 | 98.3 | 1.7 | 150 | 0.38 | 85 | 37 |
| Example 29 | 98.9 | 1.1 | 150 | 0.36 | 84 | 36 |
| Example 30 | 100 | 0 | 180 | 0.35 | 73 | 32 |
| Example 31 | 98.5 | 1.5 | 175 | 0.3 | 78 | 34 |
| Example 32 | 98.4 | 1.6 | 175 | 0.31 | 76 | 34 |
| Example 33 | 95.5 | 4.5 | 80 | 0.51 | 100 | 30 |
| Example 34 | 98.3 | 1.7 | 160 | 0.34 | 94 | 36 |
| Example 35 | 99.8 | 0.2 | 185 | 0.35 | 80 | 30 |
| Example 36 | 95.6 | 4.4 | 110 | 0.36 | 95 | 38 |
| Example 37 | 96.5 | 3.5 | 90 | 0.42 | 99 | 39 |
| Example 38 | 98.3 | 1.7 | 175 | 0.39 | 84 | 37 |
| Example 39 | 98.0 | 2.0 | 175 | 0.37 | 83 | 36 |
| Example 40 | 95.4 | 4.6 | 80 | 0.52 | 90 | 40 |
| Example 41 | 98.7 | 1.3 | 160 | 0.37 | 85 | 38 |
| Example 42 | 99.9 | 0.1 | 180 | 0.31 | 89 | 31 |
| Example 43 | 98.6 | 1.4 | 175 | 0.34 | 92 | 36 |
| Example 44 | 98.5 | 1.5 | 175 | 0.36 | 93 | 37 |
| Example 45 | 96.0 | 4.0 | 80 | 0.47 | 100 | 40 |
| Example 46 | 98.3 | 1.7 | 160 | 0.39 | 96 | 36 |
| Com. Exp. 2 | 63.0 | 37.0 | 60 | 0.08 | 20 | 10 |

TABLE 10

| Product distribution | Product weight yield (%) |
|---|---|
| Methane | 5.2 |
| Ethane | 6.1 |
| Ethylene | 28.0 |
| Propane | 6.5 |
| Propylene | 27.0 |
| Butane | 8.7 |
| Butene | 7.6 |
| Fractions having more than 5 carbons | 8.8 |
| Others | 2.1 |

TABLE 11

| Examples | Catalyst intensity (n/grain) | Ethylene yield (wt. %) | Propylene yield (wt. %) | Diene yield (wt. %) |
|---|---|---|---|---|
| Example 47 | 145 | 28 | 28 | 56 |
| Com. Exp. 2 | 80 | 23 | 22 | 45 |

Example 49

500 g of kaolin and 2 g of sesbania powder were homogeneously mixed. 2,000 g of distilled water was then added. The mixture was high velocity-sheared with a high velocity shearing machine at a rotating speed of 14,000 rpm for 30 minutes. 400 g of ZSM-5 molecular sieve having a Si—Al molecular ratio of 30 was added, and a high velocity shearing was then conducted for another 30 minutes. 500 g of aluminum sol containing 20 wt. % of alumina was added, and a high velocity shearing continued to be conducted for another 30 minutes. 1 g of triammonium citrate was added, and a high velocity shearing continued to be conducted for another 30 minutes. A laser particle size analyzer was used to determine the particle size of the suspension, wherein the average particle size was 2 µm. A spray-drier was used for spray-molding under the conditions of an inlet temperature of 240° C., an outlet temperature of 120° C., a centrifugal rotational speed of 10,000 rpm, a cyclone pressure difference of 0.7 KPa at the outlet, a feeding rate of 1 kg/h, to obtain a microsphere catalyst precursor I. The catalyst precursor I was calcined by the temperature programming method at 400° C. for 3 h, and at 650° C. for 3 h, to obtain a calcined, molded catalyst precursor II. A laser particle size analyzer was used to determine the particle size of the calcined catalyst precursor II, wherein the average particle size was 70 µm; the nitrogen adsorption and desorption method was used to determine the specific surface area, which was 310 m$^2$/g; the average pore diameter was 3.5 nm; the density of the catalyst was 0.8 g/ml; an abrader was used to determine the abrasion index, which is 0.02 wt. %/h.

200 g of a calcined, molded catalyst precursor II was disposed inside the autoclave, the bottom of which contained 50 g of water and 50 g of ethylene diamine and was separated by a screen. The catalyst was disposed onto the screen to keep the catalyst from liquid water. The catalyst was sealed in the autoclave and placed in an oven, crystallized at 180° C. for 80 h, taken out, water-washed twice, oven-dried at 120° C. in an oven for 3 h, calcined in a muffle furnace at 400° C. for 2 h and at 550° C. for 3 h, to obtain a binderless ZSM-5 fluidized-bed catalyst. The XRD spectrum of the prepared catalyst shows a pure ZSM-5 phase. The scanning electron microscope graph thereof shows pure ZSM-5 crystal grains, almost without any amorphous binder. The amorphous binder is in an amount of 0.2%, and other results are listed in Table 14.

Example 50

Figure 4:
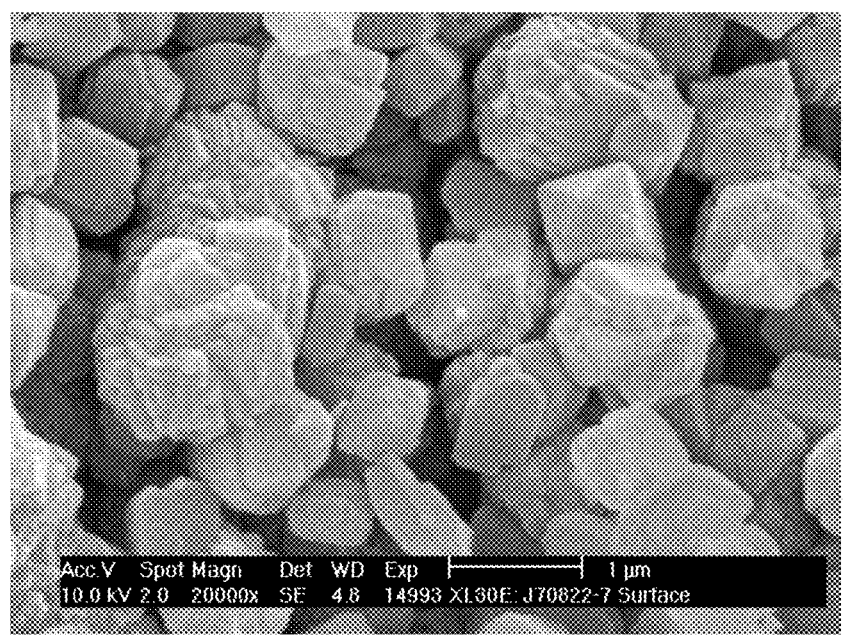
FIG. 4 shows the scanning electron microscope graph of the catalyst prepared according to Example 50.

The same method according to Example 49 was used, except for that the template ethylene diamine was not used. The scanning electron microscope of the prepared catalyst shows a part of the binder is present, as shown in FIG. 4, wherein the amorphous binder is in a content of about 5%, and other results are listed in Table 14.

Examples 51-59

The ingredients in Table 12 and preparation conditions in Table 13 were used, wherein silicasol contained 40 wt. % of silica, to prepare the fluidized-bed catalysts according to the method in Example 49. The properties of the prepared catalysts are shown in Table 13; and the results of the prepared catalysts are shown in Table 14.

Example 60

200 g of the fluidized-bed ZSM-5 catalyst prepared according to the method in Example 48 was disposed in a fluidized-bed reactor having an inner diameter of 50 mm. The activity of the catalyst was evaluated by using as the raw material $C_4$-$C_{10}$ light oils produced by Sinopec Shanghai Gaoqiao Company (see Table 4 for the physical property indexes of the raw materials) under the conditions of a reaction temperature of 680° C., a reaction pressure of 0.02 MPa, a weight hourly space velocity of 1 h$^1$, a water/methanol weight ratio of 1:1. The product distribution is shown in Table 15, wherein the ethylene weight yield is 28%; the propylene weight yield is 22%; and the diene weight total yield is 50%.

Comparative Example 3

The catalyst was prepared according to the same method as Example 50, with the difference of using no dispersant. The results of the prepared catalyst are shown in Table 14. The method in Example 60 was used to evaluate. The obtained ethylene weight yield is 22.5%, the propylene weight yield of 20.3% and the diene weight total yield of 42.8%.

TABLE 12

| Examples | Molecular sieve Type | Amount (g) | Substrate Type | Amount (g) | Binder Type | Amount (g) | Pore-expanding agent Type | Amount (g) | Dispersant Type | Amount (g) | Template Type | Amount (g) |
|---|---|---|---|---|---|---|---|---|---|---|---|---|
| Example 51 | ZSM-5 | 400 | kaolin | 500 | Aluminum sol | 500 | cellulose | 2 | triammonium citrate | 1 | Tetrapropyl-ammonium bromide | 30 |
| Example 52 | mordenite | 200 | Calcined kaolin | 700 | Aluminum sol | 500 | polyvinyl alcohol | 10 | ammonium bicarbonate | 0.1 | tetrapropyl-ammonium hydroxide | 20 |
| Example 53 | Y zeolite | 500 | diatomite | 400 | Aluminum sol | 500 | sesbania powder | 1 | ammonium carbonate | 10 | ethylene diamine | 20 |
| Example 54 | β zeolite | 200 | bentonite | 500 | Aluminum sol | 1500 | dissolvable starch | 3 | ammonium oxalate | 30 | triethylamine | 10 |
| Example 55 | MCM-22 | 400 | argil | 400 | Aluminum sol | 1000 | carbon nano-tube | 5 | triammonium citrate | 50 | Hexa-methylene-imine | 30 |
| Example 56 | ZSM-5/mordenite | 100 | Clay | 700 | Aluminum sol | 1000 | dissolvable starch | 1 | triammonium citrate | 0.5 | hexanedi-amine | 20 |
| Example 57 | ZSM-5/Y zeolite | 600 | kaolin | 200 | Silica sol | 1000 | — | — | triammonium citrate | 2 | ammonia | 40 |
| Example 58 | ZSM-5/β zeolite | 300 | kaolin | 500 | Silica sol | 1000 | dissolvable starch | 20 | triammonium citrate | 10 | tetraethyl-ammonium hydroxide | 20 |

TABLE 12-continued

| | Molecular sieve | | Substrate | | Binder | | Pore-expanding agent | | Dispersant | | Template | |
|---|---|---|---|---|---|---|---|---|---|---|---|---|
| Examples | Type | Amount (g) | Type | Amount (g) | Type | Amount (g) | Type | Amount (g) | Type | Amount (g) | Type | Amount (g) |
| Example 59 | ZSM-5 + β zeolite | 200 for each | Kaolin + bentonite | 200 for each | Aluminum sol + Silica sol | 1000 for each | dissolvable starch + sesbania powder | 5 for each | triammonium citrate + ammonium oxalate | 2 for each | ethylene diamine and n-butylamine | 20 for each |

TABLE 13

| | | Conditions for spray-molding | | | Average particle size of the catalyst precursor II (μm) | Specific surface area of the catalyst precursor II (m²/g) | Average pore diameter of the catalyst precursor II (nm) | Density of the catalyst precursor II (g/ml) | Abrasion index of the catalyst precursor II (wt. %/h) |
|---|---|---|---|---|---|---|---|---|---|---|
| Examples | Solids content (wt. %) | Particle size of suspension (μm) | centrifugal rotational speed (rpm) | cyclone pressure difference (Kpa) | Feeding speed (kg/h) | | | | | |
| Example 51 | 20 | 2.5 | 10000 | 0.6 | 2 | 72 | 295 | 1 | 0.8 | 0.01 |
| Example 52 | 30 | 3.2 | 6000 | 0.7 | 1 | 80 | 290 | 3 | 1.1 | 1.0 |
| Example 53 | 10 | 4.6 | 5000 | 0.5 | 2.5 | 100 | 240 | 5 | 1.2 | 1.2 |
| Example 54 | 40 | 5.1 | 12000 | 0.4 | 3 | 65 | 270 | 3.5 | 0.9 | 1.0 |
| Example 55 | 25 | 2.4 | 14000 | 0.6 | 4 | 60 | 260 | 2.8 | 0.8 | 0.5 |
| Example 56 | 30 | 0.5 | 15000 | 0.8 | 5 | 58 | 280 | 10 | 0.6 | 0.2 |
| Example 57 | 20 | 0.1 | 8000 | 0.9 | 2 | 76 | 260 | 15 | 1.2 | 0.02 |
| Example 58 | 30 | 1.0 | 12000 | 0.6 | 1 | 70 | 180 | 10 | 0.7 | 0.02 |
| Example 59 | 30 | 2.8 | 10000 | 0.5 | 0.5 | 66 | 100 | 5.4 | 0.8 | 0.08 |

TABLE 14

| Examples | Zeolite content (wt. %) in the resultant binderless catalyst | Binder content (wt. %) in the resultant catalyst | Pore volume (ml/g) | Average pore diameter (nm) | Porosity (vol. %) |
|---|---|---|---|---|---|
| Example 50 | 95.0 | 5.0 | 0.30 | 80 | 26 |
| Example 51 | 96.1 | 3.9 | 0.26 | 83 | 30 |
| Example 52 | 96.5 | 3.5 | 0.31 | 82 | 32 |
| Example 53 | 95.4 | 4.6 | 0.32 | 80 | 31 |
| Example 54 | 98.5 | 1.5 | 0.33 | 72 | 32 |
| Example 55 | 96.4 | 3.6 | 0.30 | 75 | 30 |
| Example 56 | 98.0 | 2.0 | 0.28 | 71 | 28 |
| Example 57 | 95.0 | 5.0 | 0.40 | 95 | 26 |
| Example 58 | 98.1 | 1.9 | 0.29 | 92 | 29 |
| Example 59 | 99.0 | 1.0 | 0.32 | 75 | 26 |
| Com. Exp. 3 | 96.7 | 3.3 | 0.32 | 82 | 30 |

TABLE 15

| Product distribution | Product weight yield (%) |
|---|---|
| Methane | 5.5 |
| Ethane | 7.6 |
| Ethylene | 28.0 |
| Propane | 7.1 |
| Propylene | 22.0 |
| Butane | 8.2 |
| Butene | 8.4 |
| Fractions having more than 5 carbons | 9.3 |
| Others | 3.9 |

Example 61

500 g of kaolin, 2 g of sesbania powder and 20 g of Wollastonite having a length-diameter ratio of 8 were homogeneously mixed. 2,000 g of distilled water was then added. The mixture was high velocity-sheared with a high velocity shearing machine for 30 minutes. 400 g of ZSM-5 molecular sieve having a Si—Al molecular ratio of 30 was added, and a high velocity shearing was then conducted for another 30 minutes. 500 g of aluminum sol containing 20 wt. % of alumina was added, and a high velocity shearing continued to be conducted for another 30 minutes. 1 g of triammonium citrate was added, and a high velocity shearing continued to be conducted for another 30 minutes. A laser particle size analyzer was used to determine the particle size of the suspension which was 2 μm. A spray-drier was used for spray-molding under the conditions of an inlet temperature of 240° C., an outlet temperature of 120° C., a centrifugal rotational speed of 10,000 rpm, a cyclone pressure difference of 0.7 KPa at the outlet, a feeding rate of 1 kg/h. The spray-molded particles were calcined by the temperature programming method at 400° C. for 3 h, and at 650° C. for 3 h. A laser particle size analyzer was used to determine the calcined catalyst precursor II, wherein the average particle size was 68 μm; the specific surface area was 305 m²/g; the average pore diameter was 3.2 nm; the density of the catalyst was 0.9 g/ml; an abrader was used to determine the abrasion index, which is 0.001 wt. %/h.

Figure 5:
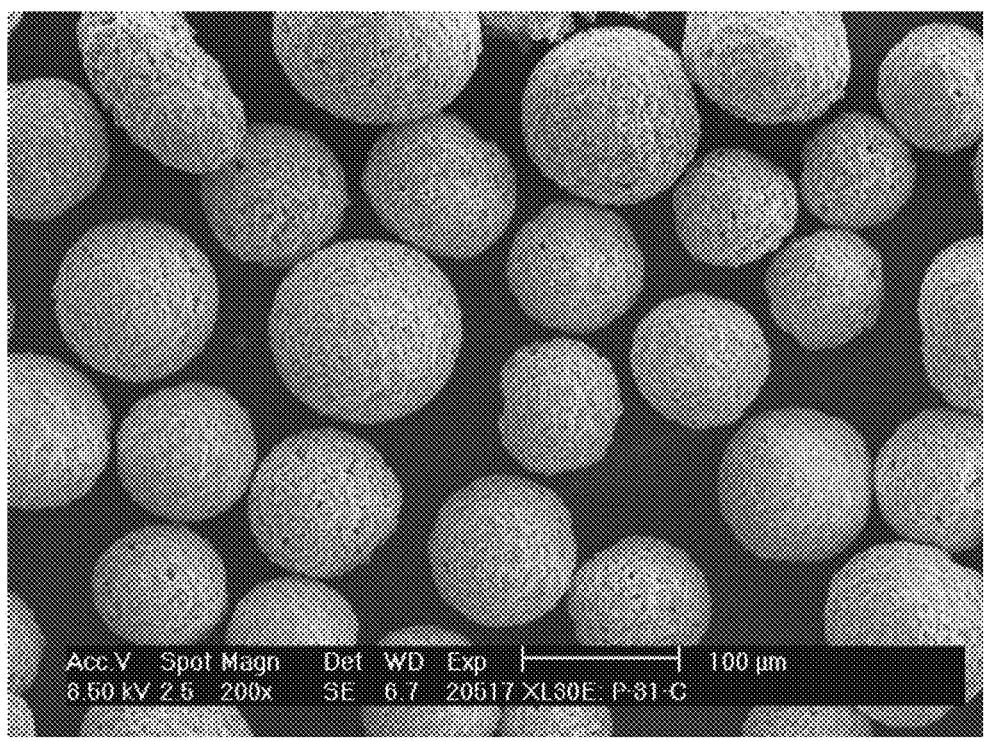
FIG. 5 shows the scanning electron microscope graph of the binderless ZSM-5 catalyst prepared according to Example 61.

200 g of the calcined and molded catalyst above was disposed inside the autoclave, the bottom of which contained 50 g of water and 50 g of ethylene diamine and was separated by a screen. The catalyst was disposed onto the screen to keep the catalyst from liquid water. The catalyst was sealed in the autoclave and placed in an oven, crystallized at 180° C. for 40 h, taken out, oven-dried at 120° C. in an oven for 3 h, calcined in a muffle furnace at 400° C. for 2 h and at 550° C. for 3 h, to obtain a binderless ZSM-5 fluidized-bed catalyst. The XRD spectrum of the prepared catalyst shows a pure ZSM-5 phase. The scanning electron microscope graph thereof as shown in FIG. 5 shows pure ZSM-5 crystal grains. The amorphous binder is in an amount of 0.3%, and other results are listed in Table 19.

Examples 62-70

The ingredients and preparation conditions in Tables 16-18 were used, wherein silicasol contained 40 wt. % of silica, to prepare the fluidized-bed catalysts according to the method in Example 61. The properties of the prepared catalysts are shown in Table 19.

Example 71

200 g of the fluidized-bed ZSM-5 catalyst prepared according to the method in Example 61 was disposed in a fluidized-bed reactor having an inner diameter of 50 mm. The activity of the catalyst was evaluated by using as the raw material $C_4$-$C_{10}$ light oils produced by Sinopec Shanghai Gaoqiao Company (see Table 4 for the physical property indexes of the raw materials) under the conditions of a reaction temperature of 680° C., a reaction pressure of 0.02 MPa, a weight hourly space velocity of 1 $h^{-1}$, a water/feedstock oil weight ratio of 1:1, to obtain the ethylene weight yield of 27%, the propylene weight yield of 23% and the diene weight total yield of 50%.

TABLE 16

| | Molecular sieve | | Substrate | | Binder | | Pore-expanding agent | |
|---|---|---|---|---|---|---|---|---|
| Examples | Type | Amount (g) | Type | Amount (g) | Type | Amount (g) | Type | Amount (g) |
| Example 62 | ZSM-5 | 400 | kaolin | 500 | Aluminum sol | 500 | cellulose | 2 |
| Example 63 | mordenite | 200 | Calcined kaolin | 700 | Aluminum sol | 500 | polyvinyl alcohol | 10 |
| Example 64 | Y zeolite | 500 | diatomite | 400 | Aluminum sol | 500 | sesbania powder | 1 |
| Example 65 | β zeolite | 200 | bentonite | 500 | Aluminum sol | 1500 | dissolvable starch | 3 |
| Example 66 | MCM-22 | 400 | argil | 400 | Aluminum sol | 1000 | carbon nano-tube | 5 |
| Example 67 | ZSM-5/ mordenite | 100 | Clay | 700 | Aluminum sol | 1000 | dissolvable starch | 1 |
| Example 68 | ZSM-5/Y zeolite | 600 | kaolin | 200 | Silica sol | 1000 | — | — |
| Example 69 | ZSM-5/β zeolite | 300 | kaolin | 500 | Silica sol | 1000 | dissolvable starch | 20 |
| Example 70 | ZSM-5 + β zeolite | 200 for each | Kaolin + bentonite | 200 for each | Aluminum sol + Silica sol | 1000 for each | dissolvable starch + sesbania powder | 5 for each |

| | Dispersant | | Anti-wear agent | | |
|---|---|---|---|---|---|
| Examples | Type | Amount (g) | Type | Length/diameter ratio | Amount (g) |
| Example 62 | tri-ammonium citrate | 1 | wollastonite | 6 | 10 |
| Example 63 | ammonium bicarbonate | 0.1 | asbestos | 10 | 2 |
| Example 64 | ammonium carbonate | 10 | ceramic fiber | 20 | 20 |
| Example 65 | ammonium oxalate | 30 | glass fiber | 10 | 10 |
| Example 66 | tri-ammonium citrate | 50 | wollastonite | 2 | 5 |
| Example 67 | tri-ammonium citrate | 0.5 | glass fiber | 10 | 3 |
| Example 68 | tri-ammonium citrate | 2 | ceramic fiber | 5 | 1 |
| Example 69 | tri-ammonium citrate | 10 | wollastonite | 8 | 2 |
| Example 70 | tri-ammonium citrate + ammonium oxalate | 2 for each | wollastonite + ceramic fiber | 8 and 10 | 5 for each |

TABLE 17

| Examples | Conditions for spray-molding ||||||| Average particle size of the catalyst precursor II (μm) | Specific surface area of the catalyst precursor II (m²/g) | Average pore diameter of the catalyst precursor II (nm) | Density of the catalyst precursor II (g/ml) | Abrasion index of the catalyst precursor II (wt. %/h) |
| --- | --- | --- | --- | --- | --- | --- | --- | --- | --- | --- | --- | --- |
| | Solids content (wt. %) | Particle size of suspension (μm) | Inlet temperature (° C.) | Outlet temperature (° C.) | centrifugal rotational speed (rpm) | cyclone pressure difference (Kpa) | Feeding speed (kg/h) | | | | | |
| Example 62 | 20 | 2.5 | 240 | 150 | 10000 | 0.6 | 2 | 72 | 295 | 1 | 0.9 | 0.001 |
| Example 63 | 30 | 3.2 | 180 | 170 | 6000 | 0.7 | 1 | 80 | 290 | 3 | 1.2 | 0.8 |
| Example 64 | 10 | 4.6 | 290 | 150 | 5000 | 0.5 | 2.5 | 100 | 240 | 5 | 1.3 | 0.5 |
| Example 65 | 40 | 5.1 | 300 | 120 | 12000 | 0.4 | 3 | 65 | 270 | 3.5 | 1.0 | 0.3 |
| Example 66 | 25 | 2.4 | 350 | 180 | 14000 | 0.6 | 4 | 60 | 260 | 2.8 | 0.9 | 0.005 |
| Example 67 | 30 | 0.5 | 200 | 100 | 15000 | 0.8 | 5 | 58 | 280 | 10 | 0.7 | 0.1 |
| Example 68 | 20 | 0.1 | 270 | 140 | 8000 | 0.9 | 2 | 76 | 270 | 15 | 1.3 | 0.005 |
| Example 69 | 30 | 1.0 | 240 | 120 | 12000 | 0.6 | 1 | 70 | 180 | 10 | 0.8 | 0.002 |
| Example 70 | 30 | 2.8 | 250 | 130 | 10000 | 0.5 | 0.5 | 66 | 100 | 5.4 | 0.9 | 0.02 |

TABLE 18

| Examples | Template used therein || Crystallization temperature (° C.) | Crystallization time (h) | Calcining temperature (° C.) | Calcining time (h) |
| --- | --- | --- | --- | --- | --- | --- |
| | Type | Amount (based on the weight percent of the molded and calcined catalyst precursor) | | | | |
| Example 62 | triethylamine | 5 | 180 | 80 | 600 | 2 |
| Example 63 | ethylene diamine | 50 | 300 | 10 | 500 | 4 |
| Example 64 | hexanediamine | 30 | 150 | 150 | 550 | 3 |
| Example 65 | tetraethylammonium hydroxide | 200 | 130 | 200 | 400 | 10 |
| Example 66 | hexamethyleneimine | 150 | 170 | 80 | 700 | 1 |
| Example 67 | triethylamine | 100 | 180 | 60 | 600 | 3 |
| Example 68 | tetrapropylammonium bromide | 80 | 190 | 240 | 550 | 4 |
| Example 69 | hexanediamine | 25 | 100 | 10 | 650 | 3 |
| Example 70 | tetrapropylammonium hydroxide | 120 | 150 | 60 | 450 | 8 |

TABLE 19

| Examples | Zeolite content (wt. %) in the resultant binderless catalyst | Binder content (wt. %) in the resultant catalyst | Pore volume (ml/g) | Average pore diameter (nm) | Porosity (vol. %) |
| --- | --- | --- | --- | --- | --- |
| Example 61 | 95.0 | 5.0 | 0.30 | 94 | 35 |
| Example 62 | 96.0 | 4.0 | 0.36 | 95 | 34 |
| Example 63 | 97.3 | 2.7 | 0.33 | 82 | 31 |
| Example 64 | 96.0 | 4.0 | 0.34 | 81 | 30 |

TABLE 19-continued

| Examples | Zeolite content (wt. %) in the resultant binderless catalyst | Binder content (wt. %) in the resultant catalyst | Pore volume (ml/g) | Average pore diameter (nm) | Porosity (vol. %) |
|---|---|---|---|---|---|
| Example 65 | 95.5 | 4.5 | 0.50 | 92 | 34 |
| Example 66 | 98.2 | 1.8 | 0.32 | 84 | 35 |
| Example 67 | 99.1 | 0.9 | 0.41 | 87 | 30 |
| Example 68 | 98.2 | 1.8 | 0.30 | 91 | 31 |
| Example 69 | 97.5 | 2.5 | 0.33 | 90 | 34 |
| Example 70 | 98.5 | 1.5 | 0.34 | 83 | 31 |

The invention claimed is:

1. A binderless molecular sieve catalyst, comprising, based on the weight of the catalyst, 95-100 wt. % of a molecular sieve, 5 wt. % or less of a binder, wherein said catalyst has a pore volume of 0.10-0.52 ml/g, an average pore diameter of 50-100 nm, and a porosity of 20-40%,
wherein the molecular sieve is one selected from the group consisting of ZSM-5, ZSM-23, ZSM-11, mordenite, Y zeolite, β zeolite, MCM-22, MCM-49, MCM-56, ZSM-5/mordenite, β zeolite/mordenite, ZSM-5/β zeolite, ZSM-5/Y, MCM-22/mordenite, ZSM-5/Magadiite, ZSM-5/β zeolite/mordenite, ZSM-5/β zeolite/Y zeolite, and ZSM-5/Y zeolite/mordenite,
wherein the binder is slicasol, alumina sol, or a combination thereof,
wherein said catalyst has a strength of 80-200 Newton per grain, and
wherein said catalyst is obtained from gas phase hydrothermal crystallization.

2. The binderless molecular sieve catalyst according to claim 1, wherein the catalyst has 0-2 wt. % of the binder and a strength of 150-200 Newton per grain.

3. The binderless molecular sieve catalyst according to claim 1, wherein the catalyst has a pore volume of 0.31-0.5 ml/g, an average pore diameter of 71-100 nm, and a porosity of 31-40%.

4. The binderless molecular sieve catalyst according to claim 1, wherein the molecular sieve is one selected from the group consisting of ZSM-23, ZSM-11, mordenite, Y zeolite, β zeolite, and β zeolite/mordenite.

5. The binderless molecular sieve catalyst according to claim 1, wherein said catalyst has a pore volume of 0.1-0.3 ml/g, an average pore diameter of 50-70 nm, and a porosity of 20-30%.

6. A process for preparing a binderless molecular sieve catalyst according to claim 1, comprising:
a) mixing a molecular sieve, an induction material, an aluminum compound and silica to obtain a mixture, molding and drying the mixture to obtain a molded catalyst precursor mix I, wherein the weight percent of the aluminum compound in the mix I is less than that of silica;
b) crystallizing the mix I at 100-200° C. in water vapor or a template vapor for 10-300 h to obtain a binderless molecular sieve catalyst precursor;
c) drying the catalyst precursor, and calcining the dried catalysts precursor at 400-700° C. for 1-10 h to obtain a binderless molecular sieve catalyst,
wherein the molecular sieve is one selected from the group consisting of ZSM-5, ZSM-23, ZSM-11, mordenite, Y zeolite, β zeolite, MCM-22, MCM-49, MCM-56, ZSM-5/mordenite, β zeolite/mordenite, ZSM-5/β zeolite, ZSM-5/Y, MCM-22/mordenite, ZSM-5/Magadiite, ZSM-5/β zeolite/mordenite, ZSM-5/β zeolite/Y zeolite, and ZSM-5/Y zeolite/mordenite,
wherein the induction material is selected from the group consisting of i) oxides of elements of Group IA or IIA of a Periodic Table of Elements, salts of weak acids of the oxides, hydroxides of the elements of Group IA or IIA of the Periodic Table of Elements, salts of weak acids of the hydroxides; ii) carbonates, bicarbonates, oxalates, and citrates of the elements of Group IA or IIA of the Periodic Table of Elements, and iii) ammonium salts
wherein the aluminum compound is selected from the group consisting of aluminum salts, aluminum oxides, hydrous oxides of aluminum, hydroxides of aluminum, and mixtures thereof.

7. The process for preparing a binderless molecular sieve catalyst according to claim 6, wherein the template is at least one selected from the group consisting of ammonia, ethylene diamine, triethylamine, n-butylamine, hexanediamine, tetrapropylammonium bromide or tetrapropylammonium hydroxide, tetraethylammonium hydroxide, tetraethylammonium bromide, and hexamethyleneimine.

8. The process for preparing a binderless molecular sieve catalyst according to claim 6, wherein the elements of Group IA are sodium and potassium; the elements of Group IIA are magnesium and calcium.

9. The process for preparing a binderless molecular sieve catalyst according to claim 6, wherein the salts of weak acids are bisulphate, sulphite, hydrosulfite, phosphate, and biphosphate.

10. The process for preparing a binderless molecular sieve catalyst according to claim 6, wherein the ammonium salt is selected from the group consisting of ammonium carbonate, ammonium bicarbonate, ammonium citrate, ammonium oxalate, ammonium sulphate, ammonium bisulphate, ammonium sulphite, ammonium bisulphite, ammonium phosphate, ammonium hydrogen phosphate, diammonium phosphate, and mixtures thereof.

11. The process for preparing a binderless molecular sieve catalyst according to claim 6, wherein the crystallization in step b) is carried out at 120-200° C. for 20-200 h.

12. The process for preparing a binderless molecular sieve catalyst according to claim 6, wherein step a) further comprises adding at least one pore-expanding agent selected from the group consisting of methyl cellulose, polyvinyl alcohol, sesbania powder, dissolvable starch, and carbon nano-tube in an amount of 0.1-2 wt. % to the mixture, wherein the weight percentage is based on the total weight of the binderless molecular sieve catalyst.

13. The process for preparing a binderless molecular sieve catalyst according to claim 1, comprising:
(a) homogeneously mixing a molecular sieve, a binder, a dispersant having an induction action, a liquid medium, an optional pore-expanding agent, an optional substrate material, and an optional anti-wear agent to form a suspension, wherein the dispersant is selected from the group consisting of i) salts of weak acids of the elements of Group IA or IIA of the Periodic Table of Elements, and ii) carbonates, bicarbonate, oxalates, and citrates of ammonium;

(b) subjecting the suspension to high velocity shearing and diffusing to control a size of particles in the suspension within 0.1-5 μm;

(c) spray-drying said suspension to form a microsphere catalyst precursor I;

(d) calcining said microsphere catalyst precursor I at 300-700° C. for 1-10 h to obtain a catalyst precursor II;

(e) crystallizing the catalyst precursor II at 100-300° C. in water vapor or a template vapor for 10-240 h to obtain a catalyst precursor III;

(f) calcining said microsphere catalyst precursor III at 400-700° C. for 1-10 h to obtain the binderless molecular sieve catalyst.

14. The process for preparing a binderless molecular sieve catalyst according to claim 13, wherein the binder is silicasol, aluminum sol, or a combination thereof, and is added into the suspension.

15. The process for preparing a binderless molecular sieve catalyst according to claim 13, wherein the substrate material is selected from the group consisting of kaolin, calcined kaolin, diatomite, bentonite, argil, clay, and mixtures thereof, and is added into the suspension.

16. The process for preparing a binderless molecular sieve catalyst according to claim 13, wherein the pore-expanding agent is selected from the group consisting of methyl cellulose, polyvinyl alcohol, sesbania powder, dissolvable starch, carbon nano-tube, and mixtures thereof, and is added into the suspension in an amount 0.1-5 wt. % based on a weight of the molecular sieve in the binderless molecular sieve catalyst.

17. The process for preparing a binderless molecular sieve catalyst according to claim 13, wherein the dispersant is selected from the group consisting of tri-ammonium citrate, ammonium oxalate, ammonium carbonate, ammonium bicarbonate, and mixtures thereof, and is added into the suspension.

18. The process for preparing a binderless molecular sieve catalyst according to claim 13, wherein the anti-wear agent is one or more inorganic material selected from the group consisting of asbestos, ceramic fiber, glass fiber, and wollastonite mineral, wherein the anti-wear agent has an average length of 1-100 μm and a length/diameter ratio of 3-10 and is added to the suspension.

19. The process for preparing a binderless molecular sieve catalyst according to claim 13, wherein the suspension in step (a) has a content of solids ranges from 10-50 wt. % of a weight of the suspension.

20. The process for preparing a binderless molecular sieve catalyst according to claim 13, wherein the size of particles in the suspension is within 0.1-2 μm.

21. The process for preparing a binderless molecular sieve catalyst according to claim 13, wherein the catalyst precursor II has an average particle size of 50-100 μm, a specific surface area of 100-310 $m^2$/g, an average pore diameter of 1-20 nm, a density of 0.6-1.2 g/ml, and an abrasion index of 0.01-1.2 wt. %/h.

22. The process for preparing a binderless molecular sieve catalyst according to claim 13, wherein the template is selected from the group consisting of ammonia, ethylene diamine, triethylamine, n-butylamine, hexanediamine, tetrapropylammonium bromide or tetrapropylammonium hydroxide, tetraethylammonium hydroxide, tetraethylammonium bromide, hexamethyleneimine, and mixtures thereof, and is added into the suspension in an amount of 5-200 wt. % based on a weight of the catalyst precursor II.

23. The process for preparing a binderless molecular sieve catalyst according to claim 13, the crystallization in step e) is carried out at 120-200° C. for 20-200 h.

* * * * *